United States Patent
Lukacs et al.

(10) Patent No.: US 9,852,295 B2
(45) Date of Patent: Dec. 26, 2017

(54) COMPUTER SECURITY SYSTEMS AND METHODS USING ASYNCHRONOUS INTROSPECTION EXCEPTIONS

(71) Applicant: Bitdefender IPR Management Ltd., Nicosia (CY)

(72) Inventors: Sandor Lukacs, Floresti (RO); Cristian B. Sirb, Alba Iulia (RO); Andrei V. Lutas, Satu Mare (RO)

(73) Assignee: Bitdefender IPR Management Ltd., Nicosia (CY)

(*) Notice: Subject to any disclaimer, the term of this patent is extended or adjusted under 35 U.S.C. 154(b) by 63 days.

(21) Appl. No.: 15/209,317

(22) Filed: Jul. 13, 2016

(65) Prior Publication Data

US 2017/0039371 A1    Feb. 9, 2017

Related U.S. Application Data

(60) Provisional application No. 62/192,384, filed on Jul. 14, 2015.

(51) Int. Cl.
*G06F 21/00* (2013.01)
*G06F 21/56* (2013.01)
(Continued)

(52) U.S. Cl.
CPC .......... *G06F 21/564* (2013.01); *G06F 3/0622* (2013.01); *G06F 3/0653* (2013.01);
(Continued)

(58) Field of Classification Search
CPC ........ G06F 21/564; G06F 21/53; G06F 21/54; G06F 21/55; G06F 3/0622; G06F 3/0653; G06F 3/0673
(Continued)

(56) References Cited

U.S. PATENT DOCUMENTS 5,826,084 A    10/1998    Brooks et al.
7,418,584 B1    8/2008    Klaiber et al.
(Continued)

FOREIGN PATENT DOCUMENTS

WO    2009151888 A2    12/2009

OTHER PUBLICATIONS

McKeen, Frank, et al. "Innovative instructions and software model for isolated execution." HASP@ ISCA 10 (2013).*
(Continued)

*Primary Examiner* — Syed Zaidi
(74) *Attorney, Agent, or Firm* — Law Office of Andrei D Popovici, PC

(57) ABSTRACT

Described systems and methods enable an efficient analysis of security-relevant events, especially in hardware virtualization platforms. In some embodiments, a notification handler detects the occurrence of an event within a virtual machine, and communicates the respective event to security software. The security software then attempts to match the respective event to a collection of behavioral and exception signatures. An exception comprises a set of conditions which, when satisfied by an <event, entity> tuple, indicates that the respective entity is not malicious. In some embodiments, a part of exception matching is performed synchronously (i.e., while execution of the entity that triggered the respective event is suspended), while another part of exception matching is performed asynchronously (i.e., after the triggering entity is allowed to resume execution).

19 Claims, 10 Drawing Sheets

(51) Int. Cl.
*G06F 21/53* (2013.01)
*G06F 21/54* (2013.01)
*G06F 21/55* (2013.01)
*G06F 3/06* (2006.01)

(52) U.S. Cl.
CPC ............ *G06F 3/0673* (2013.01); *G06F 21/53* (2013.01); *G06F 21/54* (2013.01); *G06F 21/55* (2013.01)

(58) Field of Classification Search
USPC ......................................................... 726/23
See application file for complete search history.

(56) References Cited

U.S. PATENT DOCUMENTS

| | | | |
|---|---|---|---|
| 7,596,227 B2* | 9/2009 | Illowsky | G06F 1/3203 380/277 |
| 7,657,419 B2 | 2/2010 | van der Made | |
| 7,685,635 B2 | 3/2010 | Vega et al. | |
| 7,748,039 B2 | 6/2010 | Obrecht et al. | |
| 8,065,728 B2 | 11/2011 | Wang et al. | |
| 8,099,596 B1 | 1/2012 | Rusakov et al. | |
| 8,561,060 B2 | 10/2013 | Serebrin et al. | |
| 8,566,943 B2* | 10/2013 | Martynenko | G06F 21/55 726/22 |
| 8,578,345 B1 | 11/2013 | Kennedy et al. | |
| 8,650,650 B1 | 2/2014 | Pavlyushchik | |
| 8,762,948 B1 | 6/2014 | Laitsev | |
| 8,863,283 B2 | 10/2014 | Sallam | |
| 8,935,791 B2 | 1/2015 | Martynenko et al. | |
| 9,015,704 B2 | 4/2015 | Vandegrift et al. | |
| 9,323,931 B2 | 4/2016 | Lukacs et al. | |
| 2004/0117532 A1 | 6/2004 | Bennett et al. | |
| 2004/0168157 A1 | 8/2004 | Hundt et al. | |
| 2005/0091652 A1 | 4/2005 | Ross et al. | |
| 2005/0251803 A1 | 11/2005 | Turner et al. | |
| 2010/0031353 A1 | 2/2010 | Thomas et al. | |
| 2010/0031360 A1 | 2/2010 | Seshadri et al. | |
| 2010/0107252 A1 | 4/2010 | Mertoguno | |
| 2011/0083176 A1 | 4/2011 | Martynenko et al. | |
| 2011/0213765 A1 | 9/2011 | Cui et al. | |
| 2011/0258610 A1 | 10/2011 | Aaraj et al. | |
| 2011/0307955 A1 | 12/2011 | Kaplan et al. | |
| 2012/0254993 A1 | 10/2012 | Sallam | |
| 2012/0254999 A1* | 10/2012 | Sallam | G06F 21/566 726/23 |
| 2012/0255000 A1* | 10/2012 | Sallam | G06F 21/566 726/23 |
| 2012/0255001 A1* | 10/2012 | Sallam | G06F 21/566 726/23 |
| 2012/0255002 A1* | 10/2012 | Sallam | G06F 21/566 726/23 |
| 2012/0255003 A1* | 10/2012 | Sallam | G06F 21/554 726/23 |
| 2012/0255004 A1* | 10/2012 | Sallam | G06F 21/52 726/23 |
| 2012/0255012 A1 | 10/2012 | Sallam | |
| 2012/0255031 A1* | 10/2012 | Sallam | G06F 21/53 726/27 |
| 2012/0324575 A1 | 12/2012 | Choi et al. | |
| 2013/0007325 A1* | 1/2013 | Sahita | G06F 13/24 710/267 |
| 2013/0086632 A1* | 4/2013 | Gartside | G06F 21/50 726/1 |
| 2013/0139262 A1* | 5/2013 | Glew | G06F 21/56 726/23 |
| 2013/0340077 A1 | 12/2013 | Salsamendi et al. | |
| 2014/0053272 A1 | 2/2014 | Lukacs et al. | |
| 2014/0130158 A1 | 5/2014 | Wang et al. | |
| 2014/0189687 A1 | 7/2014 | Jung et al. | |
| 2014/0215226 A1 | 7/2014 | Litty et al. | |
| 2015/0074806 A1 | 3/2015 | Roundy et al. | |
| 2015/0121135 A1 | 4/2015 | Pape | |
| 2015/0128205 A1* | 5/2015 | Mahaffey | H04L 63/20 726/1 |
| 2015/0186641 A1* | 7/2015 | Cabrera | G06F 21/554 726/23 |
| 2015/0186643 A1 | 7/2015 | Tu et al. | |
| 2015/0215327 A1* | 7/2015 | Cabrera | H04L 63/1416 726/23 |
| 2015/0319182 A1 | 11/2015 | Natarajan et al. | |
| 2015/0379279 A1 | 12/2015 | Feroz et al. | |

OTHER PUBLICATIONS

European Patent Office, International Search Report and Written Opinion dated Oct. 7, 2016 for PCT International Application No. PCT/EP2016/066745, International filing date Jul. 14, 2016, priority date Jul. 14, 2015.

McDowell et al., "Pacifica-Next Generation Architecture for Efficient Virtual Machines," Presentation at WinHEC 2005, Advanced Micro Devices, p. 1-29, Sunnyvale, CA, Apr. 2005.

FAYDOC, "CMPXCHG8B—Compare and Exchange 8 Bytes," Intel Pentium Instruction Set Reference, p. 1, archive.org indicates the webpage was available on Nov. 15, 2006.

Beck et al., "Syscall Interception in Xen Hypervisor," HAL, p. 1-23, Inria, Rocquencourt, France, Nov. 10, 2009.

AMD, "AMD64 Architecture Programmer's Manual vol. 2: System Programming," AMD64 Technology, Advanced Micro Devices, p. 1-86, Sunnyvale, CA, May 2013.

Jurczyk, Mateusz, "Windows X86 System Call Table (NT/2000/XP/2003/Vista/2008/7/8)," p. 1-7, Team Vexillium, Poland, archive.org indicates the webpage was available on Dec. 1, 2013.

Jeschke, Rene, "LDS/LES/LFD/LGS/LSS: Load Far Pointer," x86 Instruction Set Reference, p. 1, archive.org indicates the webpage was available on Jul. 27, 2014.

Intel, "Intel Architecture Instruction Set Extensions Programming Reference," Intel Corporation, p. 1-30, Santa Clara, CA, Oct. 2014.

Intel, "Vmcall", Intel Corporation, Intel 64 and IA-32 Architecture Software Developer's Manual, Combined vols. 1, 2A, 2B, 3A, 3B, and 3C, p. 3032-3033, Santa Clara, CA, Jan. 2015.

World of Computing "Instructions in Microprocessor", 4 pages. http://www.worldofcomputing.net/processor/instructions-in-microprocessor.html, date listed on PTO-892 as Apr. 7, 2013.

Whatis "no op (no operation)", retrieved from http://whatis.techtarget.com/definition/no-op-operation, date listed on PTO-892 as Mar. 24, 2011.

Lukacs, U.S. Appl. No. 14/665,888, filed Mar. 23, 2015.
Lukacs, U.S. Appl. No. 14/665,917, filed Mar. 23, 2015.
Lukacs, U.S. Appl. No. 14/665,856, filed Mar. 23, 2015.
Lukacs, U.S. Appl. No. 15/201,035, filed Jul. 1, 2016.

USPTO, Office Action dated May 6, 2016 for U.S. Appl. No.14/665,888, filed Mar. 23, 2015.

USPTO, Office Action dated Jun. 27, 2016 for U.S. Appl. No. 14/665,917, filed Mar. 23, 2015.

USPTO, Office Action dated May 4, 2016 for U.S. Appl. No. 14/665,856, filed Mar. 23, 2015.

\* cited by examiner

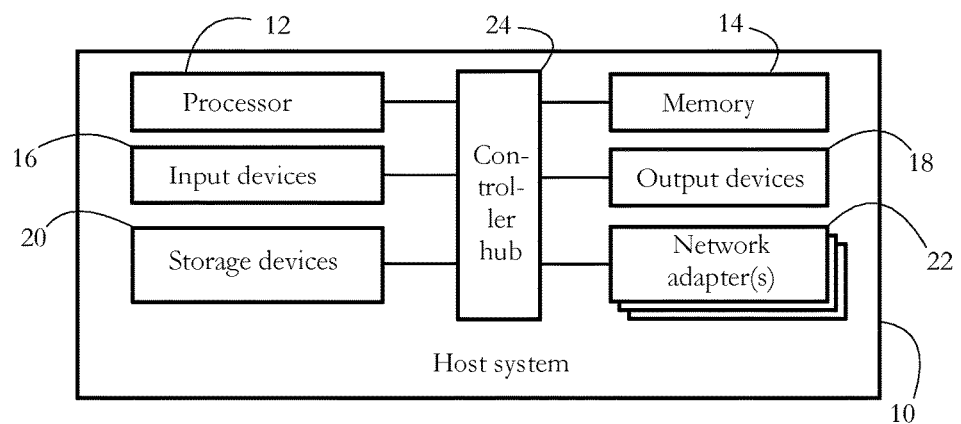
FIG. 1
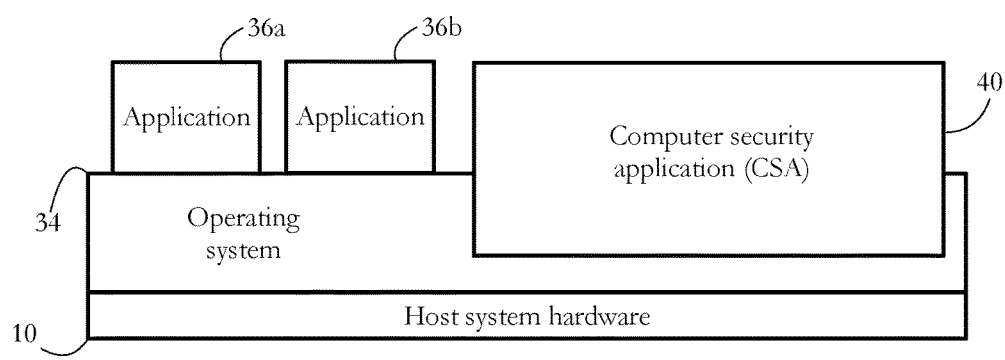
FIG. 2-A

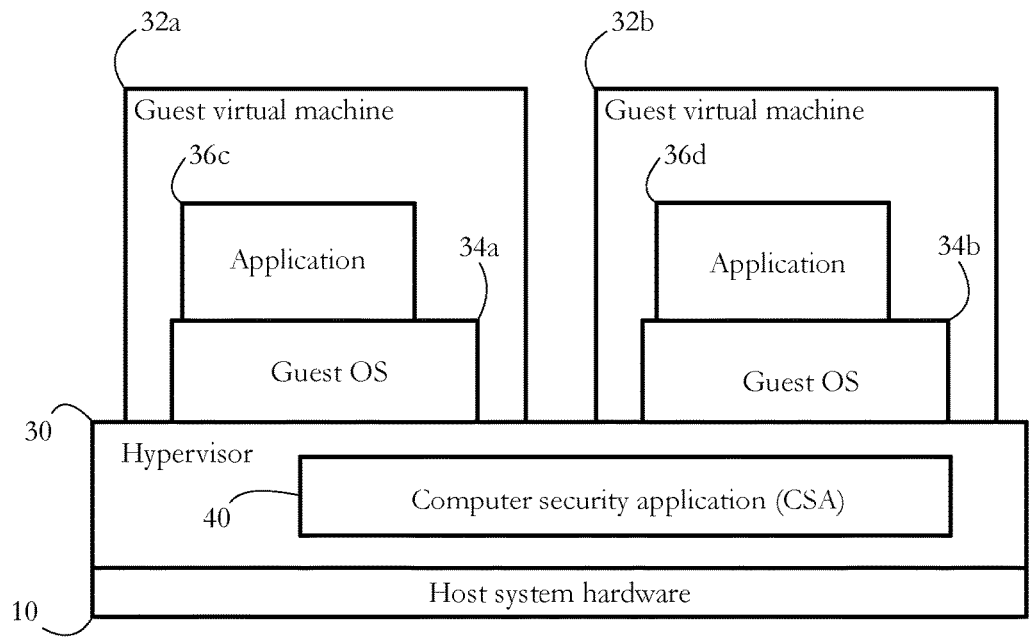
FIG. 2-B
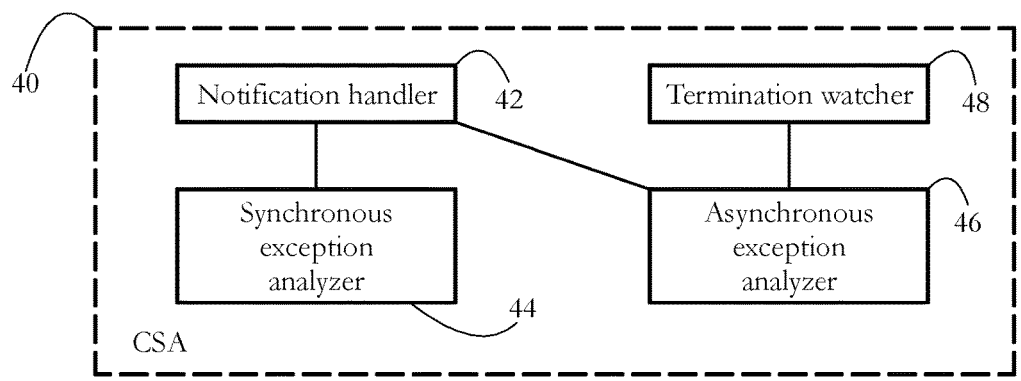
FIG. 3

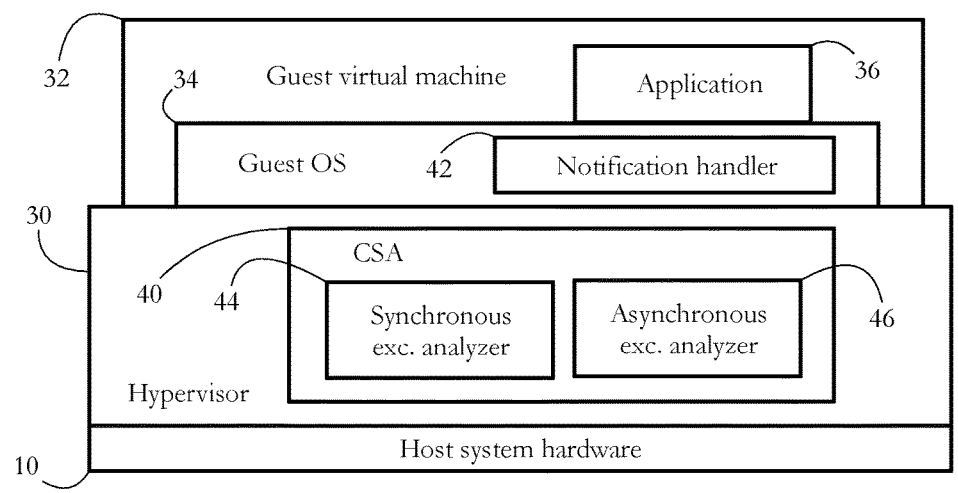
FIG. 4-A
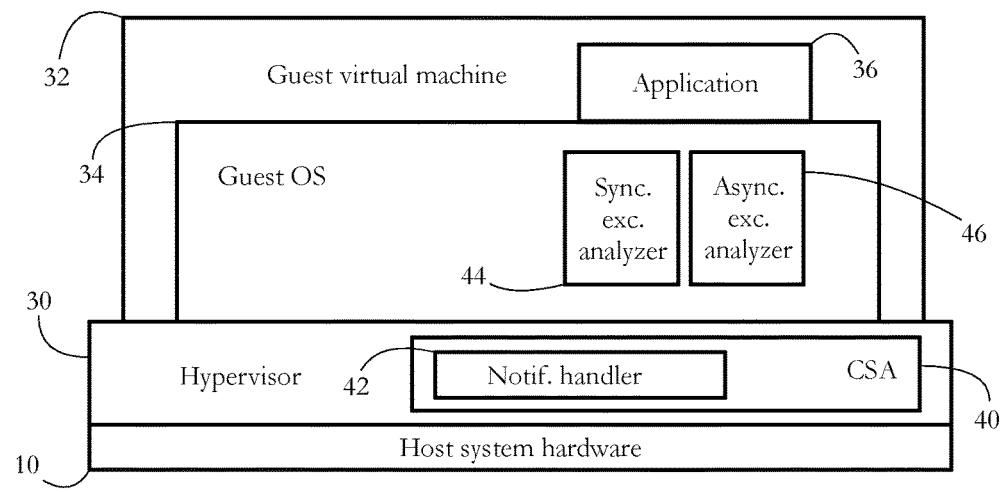
FIG. 4-B

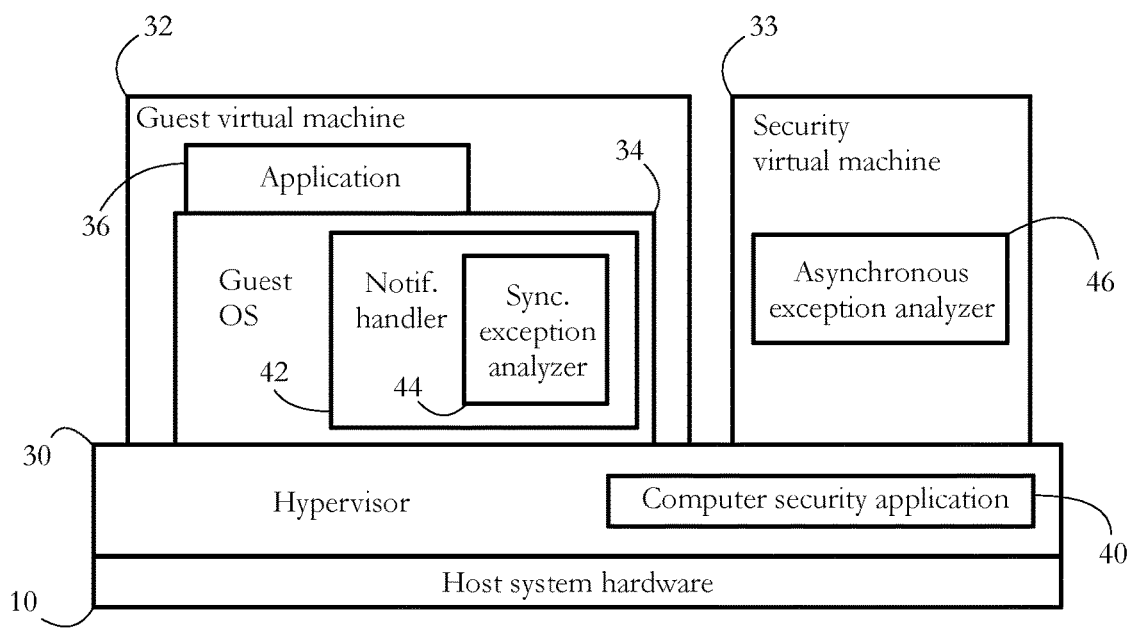
FIG. 4-C

COMPUTER SECURITY SYSTEMS AND METHODS USING ASYNCHRONOUS INTROSPECTION EXCEPTIONS

RELATED APPLICATIONS

This application claims the benefit of the filing date of U.S. provisional patent application No. 62/192,384, filed on Jul. 14, 2015, entitled "Computer Security Systems and Methods Using Asynchronous Introspection Exceptions," the entire contents of which are incorporated by reference herein.

BACKGROUND

The invention relates to computer security systems and methods, and in particular, to systems and methods for protecting hardware virtualization environments from computer security threats.

Malicious software, also known as malware, affects a great number of computer systems worldwide. In its many forms such as computer viruses, worms, rootkits, spyware, and unwanted adware, malware presents a serious risk to millions of computer users, making them vulnerable to loss of data and sensitive information, identity theft, and loss of productivity, among others.

Computer security software may be used to protect computer systems from malicious software. Commonly used methods of detecting and combating malware include signature matching and behavioral methods. Signature-based methods attempt to match a section of code of a target software entity to a collection of code snippets extracted from software known to be malicious. Behavioral methods generally comprise detecting the occurrence of an event caused by or occurring during execution of a target software entity, and analyzing the respective event to determine whether it indicates a potential security threat.

Conventional event detection typically relies on a class of methods known in the art as hooking. Such methods are often vulnerable and may be thwarted by malicious software. Furthermore, conventional behavioral methods usually suspend execution of the entity that caused a detected event, while the respective event is analyzed for indicators of malice. Such suspensions may negatively impact user experience, especially in hardware virtualization configurations wherein security software executes outside a protected virtual machine.

There is a continuing interest in improving the efficiency of computer security systems and methods, and in particular in developing systems and methods that address the above shortcomings related to event detection and analysis.

SUMMARY

According to one aspect, a host system comprises a hardware processor and a memory, the hardware processor configured to execute a target entity, a synchronous exception analyzer, and an asynchronous exception analyzer. The hardware processor is further configured, in response to detecting an occurrence of an event caused by an execution of the target entity, to suspend the execution of the target entity, and in response to suspending execution of the target entity, to switch to executing the synchronous exception analyzer. The synchronous exception analyzer is configured to determine whether the target entity is suspect of being malicious according to the event. The synchronous exception analyzer is further configured, in response, when the target entity is suspect of being malicious, to selectively retrieve a rule exception signature from a plurality of rule exception signatures, the rule exception signature retrieved according to the event, wherein the rule exception signature comprises an encoding of a first condition and an encoding of a second condition. The synchronous exception analyzer is further configured, in response to retrieving the exception signature, to determine whether the first condition is satisfied according to the event and according to the target entity. In response to determining whether the first condition is satisfied, when the first condition is satisfied, the synchronous exception analyzer is further configured to cause the hardware processor to resume execution of the target entity. The synchronous exception analyzer is further configured, in response to determining whether the first condition is satisfied, when the first condition is not satisfied, to determine that the target entity is malicious. The asynchronous exception analyzer is configured, in response to the hardware processor resuming execution of the target entity, to determine whether the second condition is satisfied according to the event and according to the target entity. The asynchronous exception analyzer is further configured, in response to determining whether the second condition is satisfied, when the second condition is satisfied, to determine that the target entity is not malicious. The asynchronous exception analyzer is further configured, in response to determining whether the second condition is satisfied, when the second condition is not satisfied, to determine that the target entity is malicious.

According to another aspect, a non-transitory computer-readable medium stores processor instructions which, when executed by a hardware processor of a host system, cause the host system to form a synchronous exception analyzer and an asynchronous exception analyzer. The hardware processor is further configured, in response to detecting an occurrence of an event caused by an execution of the target entity, to suspend the execution of the target entity, and in response to suspending execution of the target entity, to switch to executing the synchronous exception analyzer. The synchronous exception analyzer is configured to determine whether the target entity is suspect of being malicious according to the event. The synchronous exception analyzer is further configured, in response, when the target entity is suspect of being malicious, to selectively retrieve a rule exception signature from a plurality of rule exception signatures, the rule exception signature retrieved according to the event, wherein the rule exception signature comprises an encoding of a first condition and an encoding of a second condition. The synchronous exception analyzer is further configured, in response to retrieving the exception signature, to determine whether the first condition is satisfied according to the event and according to the target entity. In response to determining whether the first condition is satisfied, when the first condition is satisfied, the synchronous exception analyzer is further configured to cause the hardware processor to resume execution of the target entity. The synchronous exception analyzer is further configured, in response to determining whether the first condition is satisfied, when the first condition is not satisfied, to determine that the target entity is malicious. The asynchronous exception analyzer is configured, in response to the hardware processor resuming execution of the target entity, to determine whether the second condition is satisfied according to the event and according to the target entity. The asynchronous exception analyzer is further configured, in response to determining whether the second condition is satisfied, when the second condition is satisfied, to determine that the target entity is not malicious. The asynchronous exception analyzer is further configured, in response to determining whether the second condition is satisfied, when the second condition is not satisfied, to determine that the target entity is malicious.

According to another aspect, a method protects a host system against computer security threats, wherein the host system comprises a hardware processor and a memory. The method comprises employing the hardware processor to detect an occurrence of an event caused by an execution of a target entity. The method further comprises, in response to detecting the occurrence of the event, employing the hardware processor to suspend the execution of the target entity and to switch to executing a synchronous exception analyzer. The synchronous exception analyzer is configured to determine whether the target entity is suspect of malice according to the event. In response, when the target entity is suspect of malice, the synchronous exception a analyzer is configured to selectively retrieve a rule exception signature from a plurality of rule exception signatures, the rule exception signature retrieved according to the event, wherein the rule exception signature comprises an encoding of a first condition and an encoding of a second condition. The synchronous exception analyzer is further configured, in response to retrieving the rule exception signature, to determine whether the first condition is satisfied according to the event and according to the target entity. The synchronous exception analyzer is further configured, in response to determining whether the first condition is satisfied, when the first condition is satisfied, to cause the hardware processor to resume execution of the target entity, and when the first condition is not satisfied, to determine that the target entity is malicious. The method further comprises, in response to the hardware processor resuming execution of the target entity, employing the hardware processor to determine whether the second condition is satisfied according to the event and according to the target entity. The method further comprises, in response to determining whether the second condition is satisfied, when the second condition is satisfied, determining that the target entity is not malicious, and when the second condition is not satisfied, determining that the target entity is malicious.

BRIEF DESCRIPTION OF THE DRAWINGS

The foregoing aspects and advantages of the present invention will become better understood upon reading the following detailed description and upon reference to the drawings where:

FIG. 1 illustrates an exemplary hardware configuration of a host system protected against computer security threats according to some embodiments of the present invention.

FIG. 2-A shows an exemplary computer security application (CSA) protecting the host system according to some embodiments of the present invention, in a configuration that does not involve hardware virtualization.

FIG. 2-B shows an alternative configuration according to some embodiments of the present invention, wherein an exemplary set of protected virtual machines are exposed by a hypervisor executing on the host system, and wherein the CSA executes outside the protected virtual machine(s).

FIG. 3 illustrates exemplary components of a computer security application according to some embodiments of the present invention.

FIG. 4-A shows an exemplary configuration, wherein the notification handler executes within the protected virtual machine, and wherein the synchronous and asynchronous exception analyzers execute outside the protected virtual machine.

FIG. 4-B shows an alternative configuration according to some embodiments of the present invention, wherein the notification handler executes outside the protected virtual machine, and wherein the synchronous and asynchronous exception analyzers execute within the protected virtual machine.

FIG. 4-C shows yet another exemplary configuration according to some embodiments of the present invention, wherein the asynchronous exception analyzer executes within a security virtual machine distinct from the protected virtual machine.

DETAILED DESCRIPTION OF PREFERRED EMBODIMENTS

Figure 5:
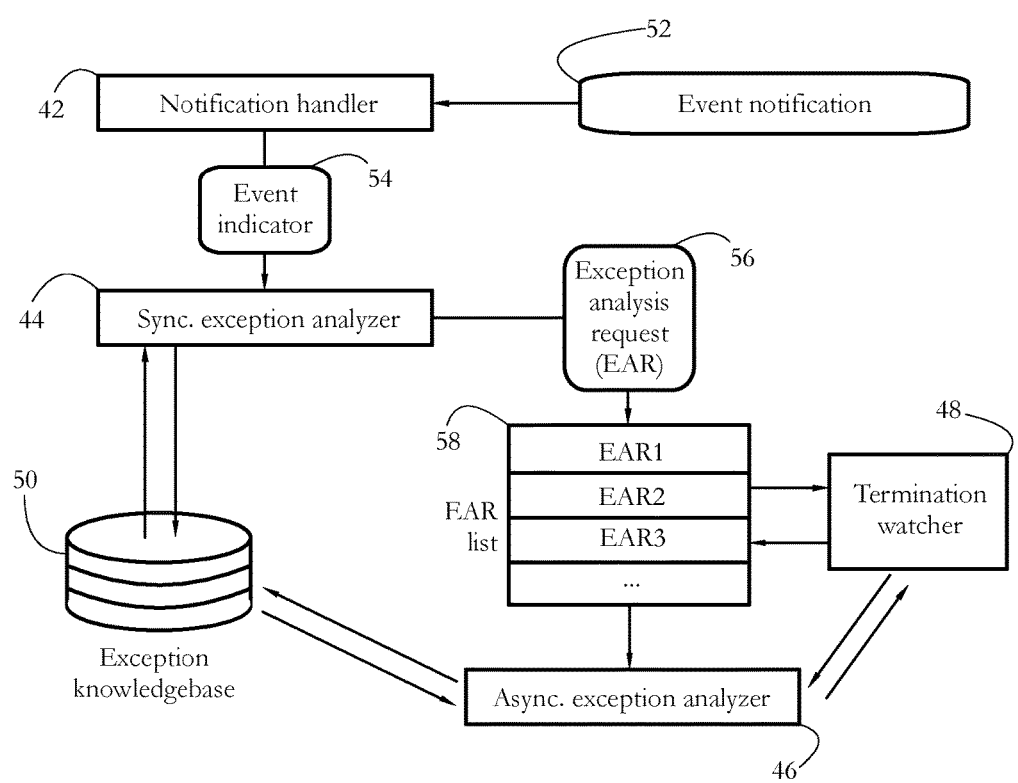
FIG. 5 shows an exemplary interaction of the components of the computer security application according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, unintended or unauthorized modification of data and/or hardware, and destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a guest process is a process executing within a virtual machine. A process is said to execute within a virtual machine when it executes on a virtual processor of the respective virtual machine. Unless otherwise specified, a page represents the smallest unit of virtual memory that can be individually mapped to a physical memory of a host system. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter al/a, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

FIG. 1 shows an exemplary hardware configuration of a host system 10 protected against computer security threats according to some embodiments of the present invention. Host system 10 may represent any electronic device having a processor and a memory. Exemplary host systems 10 include personal computers, servers, laptops, tablet computers, mobile telecommunication devices (e.g., smartphones), media players, TVs, game consoles, home appliances (e.g., refrigerators, thermostats, intelligent heating and/or lighting systems), and wearable devices (e.g. smartwatches, sports and fitness equipment), among others.

FIG. 1 illustrates a computer system; the hardware configuration of other host systems, such as smartphones and smartwatches, may differ from the illustrated configuration. Host system 10 comprises a set of physical devices, including a processor 12 and a memory unit 14. In some embodiments, processor 12 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 12 in the form of a sequence of processor instructions (e.g. machine code or other type of encoding). Memory unit 14 may comprise volatile computer-readable media (e.g. DRAM, SRAM) storing instructions and/or data accessed or generated by processor 12.

Depending on the type and performance of device, host system 10 may further comprise a set of input devices 16, such as a keyboard, mouse, touchscreen, etc., enabling a user to input data and/or instructions to host system 10. A set of output devices 18, such as a monitor or liquid crystal display, may convey information to the user, e.g., via a graphical user interface. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 24 may include a memory management unit (MMU), an input/output (I/O) controller, and an interrupt controller, among others. In another example, controller hub 24 may comprise a northbridge connecting processor 12 to memory 14 and/or a southbridge connecting processor 12 to devices 16, 18, 20, and 22. In some embodiments, controller hub 24 may be integrated, in part or entirely, with processor 12, e.g., the MMU may share a common semiconductor substrate with processor 12.

A computer security application (CSA) 40 protects host system 10 against computer security threats such as malware, spyware, unwanted adware, etc. In some embodiments, CSA 40 is configured to monitor the behavior of a plurality of executable entities (e.g., processes, threads, applications, components of the operating system), and to determine whether any such monitored entity is malicious according to its behavior. Monitored entities may include components of an operating system and user applications, among others. In response to determining that an entity is malicious, CSA 40 may take protective action against the respective entity, for instance to stop, quarantine, or otherwise incapacitate the respective malicious entity.

FIGS. 2-A-B show exemplary software configurations according to some embodiments of the present invention. In the example of FIG. 2-A, host system 10 executes an operating system (OS) 34, a set of exemplary applications 36a-b, and CSA 40. Applications 36a-b generically represent any computer program such as word processing, image processing, media player, database, calendar, personal contact management, browser, gaming, voice communication, and data communication applications, among others. Operating system 34 may comprise any widely available operating system such as Microsoft Windows®, MacOS®, Linux®, iOS®, or Android®, among others. OS 34 provides an interface between applications 36a-b and the hardware of host system 10. The illustrated position of CSA 40 indicates that CSA 40 may execute at various processor privilege levels. For instance, a part of CSA 40 may execute at the processor privilege of the OS kernel (e.g., ring 0, kernel mode), while other parts may execute at the processor privilege of applications 36a-b (e.g., ring 3, user mode).

FIG. 2-B shows an alternative embodiment of the present invention, wherein host system 10 uses hardware virtualization technology to operate a set of guest virtual machines. Hardware virtualization is often used in applications such as cloud computing and server consolidation, among others uses. A virtual machine (VM) emulates an actual physical machine/computer system, and is capable of running an operating system and other applications. In some embodiments, a hypervisor 30 executes on host system 10, hypervisor 30 configured to create or enable a plurality of virtualized devices, such as a virtual processor and a virtual memory management unit, and to present such virtualized devices to other software, in place of the real, physical devices of host system 10. Such operations are commonly known in the art as exposing a virtual machine. Hypervisor 30 may further enable multiple virtual machines to share the hardware resources of host system 10, so that each VM operates independently and is unaware of other VMs executing concurrently on host system 10. Examples of popular hypervisors include the VMware vSphere™ from VMware Inc. and the open-source Xen hypervisor, among others.

FIG. 2-B shows a set of guest VMs 32a-b exposed on host system 10. Each VM 32a-b includes a virtualized processor, and may further include other virtualized devices such virtualized input, output, storage, and network devices, as well as virtualized controller, among others. Each virtualized processor comprises an emulation of at least some of the functionality of hardware processor 12, and is configured to receive processor instructions for execution. Software using the respective virtual processor for execution is said to execute within the respective virtual machine. For instance, in the example of FIG. 2-B, guest OS 34a and application 36c are said to execute within guest VM 32a. In contrast, hypervisor 30 is said to execute outside, or below, guest VMs 32a-b. Each virtualized processor may interact with such virtualized devices as it would with the corresponding physical devices. For instance, software executing within VM 32a may send and/or receive network traffic via virtualized network adapter(s) of VM 32a. In some embodiments, hypervisor 30 may expose only a subset of virtualized devices to each guest VM, and may give a selected guest VM direct and exclusive use of some hardware devices of host system 10. In one such example, VM 32a may have exclusive use of input devices 16 and output devices 18, but lack a virtualized network adapter. Meanwhile, VM 32b may have direct and exclusive use of network adapter(s) 22. Such configurations may be implemented, for instance, using VT-d® technology from Intel®.

Each VM 32a-b executes a guest operating system (OS) 34a-b, respectively. Each OS 34a-b provides an interface between applications 36c-d executing within the respective VM and the virtualized hardware devices of the respective VM. In the exemplary embodiment of FIGS. 2-B, CSA 40 executes outside guest VMs, and is configured to protect the respective guest VMs from computer security threats. A single computer security application may protect a plurality of virtual machines. CSA 40 may be incorporated into hypervisor 30, for instance as a library, or may be delivered as a computer program distinct and independent from hypervisor 30, but executing at the processor privilege level of hypervisor 30 (e.g., root mode, ring—1). CSA 40 may be a process having a separate scheduled execution thread, or may operate as a collection of unscheduled code objects executing when triggered by certain notification events, as illustrated further below.

Several methods of protecting host systems, including hardware virtualization platforms, from malware are known in the art. A particular category of methods is known as behavior analysis. Typical behavior analysis methods employ a notification mechanism, wherein security software is notified of the occurrence of an event within a monitored VM, the event triggered by and/or occurring during execution of a software entity, such as an application or component of the operating system. The security software may then analyze the respective event to determine whether it indicates a potential security threat.

FIG. 3 shows exemplary components of computer security application 40 according to some embodiments of the present invention. Engine 40 includes a notification handler 42, a synchronous exception analyzer 44 connected to handler 42, an asynchronous exception analyzer 46, and a termination watcher 48 communicatively coupled to analyzer 46.

In some embodiments, notification handler 42 is configured to detect the occurrence of certain events relevant to computer security. Exemplary detected events include, among others, calls to certain OS functions and system calls. Other types of detected events may include opening a file, creating a file, writing to a file, deleting a file, copying a file, creating a process, terminating a process, scheduling a thread for execution, suspending a thread because of a synchronization event (e.g. mutual exclusion), creating a heap, allocating memory from heap, extending the size of an execution stack, changing a memory access permission, performing a swap-in (e.g. disk-to-memory) operation, performing a swap-out (e.g. memory-to-disk) operation, loading an executable module (e.g., shared library—DLL), opening a registry key, renaming a registry key, detecting the attachment of a new hardware device, establishing a new network connection, receiving a network packet, raising the execution privileges of a thread, changing the discretionary access control (DAC) permission associated with a file. Several methods of detecting such events are known in the art. They include hooking certain OS functions, modifying dispatch tables, etc. Such methods configure processor 12 to switch from executing the triggering entity (e.g., a process) to executing a handler routine in response to an occurrence of the respective event. Registering notification handler 42 as the handler routine allows handler 42 to detect various events, and to communicate their occurrence to CSA 40.

In hardware virtualization platforms, a special category of detected events which may be relevant to computer security includes detecting a violation of a memory access permission. Detecting such violations may provide an alternative to conventional hooking. Most modern computer systems are configured to operate with virtual memory and to manage memory address translations using dedicated data structures, for instance page tables. Systems configured to support hardware virtualization typically use a second layer of address translations, from a guest-physical memory seen by each exposed VM to the actual physical memory 14 of the host system. The second address translation is typically achieved using hardware-accelerated, dedicated data structures and mechanisms controlled by processor 12, known as second level address translation (SLAT). Popular SLAT implementations include extended page tables (EPT) on Intel® platforms, and rapid virtualization indexing (RVI)/nested page tables (NPT) on AMD® platforms. SLAT typically allows setting memory access permissions for each memory page, such as read/write/execute. Processor 12 may be configured to trigger a processor event (e.g., a VM exit event or a virtualization exception) when software attempts to access the respective page in a manner that violates the current access permissions. VM exit events, for instance VMExit on Intel® platforms, suspend execution of code within the respective VM and switch processor 12 to executing code at the level of hypervisor 30. In contrast, virtualization exceptions such as #VE on Intel® platforms, may switch processor 12 to executing code within the same VM. In some embodiments, CSA 40 registers notification handler 42 as the handler for VM exits (e.g., in configurations such as FIG. 4-B) or virtualization exceptions (e.g., in configurations such as FIGS. 4-A and 4-C). This enables handler 42 to detect attempts to violate memory access permissions within a protected virtual machine, and to communicate such attempts to CSA 40.

Conventional security systems often rely on malware behavioral signatures to detect malicious entities. A malware behavioral signature comprises a set of conditions, which, when satisfied by an event (or sequence of events), indicates that the entity triggering the respective event(s) is malicious. For instance, the sequence of code injection followed by writing to disk may be considered an indicator of malice. Malware behavioral signatures may enable a high detection rate, but typically also produce a relatively high rate of false positives (benign entities falsely labeled as malicious). Reducing the rate of false positives may require increasing the complexity of malware behavioral signatures, which may substantially increase computational overhead.

In contrast to such signature-based methods, the present invention introduces a set of rule exceptions to replace or to complement malware behavioral signatures. In some embodiments, a rule exception comprises a set of conditions which, when satisfied by an <event, triggering entity> tuple, establish that the respective triggering entity is benign (not malicious). An <event, triggering entity> tuple that satisfies conditions of a rule exception is herein said to match the respective rule exception. A typical use scenario for such rule exceptions comprises first applying a malware behavioral signature to a detected event. When the event matches a signature that is indicative of malice, CSA 40 may further try to match the event to a set of rule exceptions. When no rule exception matches the detected event, CSA 40 may conclude that the triggering entity is indeed malicious. Instead, when the event matches at least one rule exception, CSA 40 may conclude that the triggering entity is benign. This analysis strategy may substantially reduce the rate of false positives, while also keeping computational overhead in check. The reduction of computational costs may come, for instance, from using simpler malware behavioral signatures than in conventional computer security systems.

Conventional behavioral security methods include suspending execution of the triggering entity while the detecting event is analyzed. This kind of event analysis is commonly known as synchronous. In contrast, in some embodiments of the present invention only a part of the event analysis is performed synchronously, while another part of the analysis is performed asynchronously. The term asynchronous herein refers to a manner of analyzing an event and/or rule exception, wherein the triggering entity is allowed to continue execution, while data about the respective event/exception is saved for later analysis.

In particular, in some embodiments of the present invention, some rule exception matching is performed synchronously, while other rule exception matching is performed asynchronously. Synchronous exception analyzer 44 may be configured to carry out a synchronous analysis of an event occurring within the protected host system or guest VM, to determine whether it satisfies (matches) any of a predetermined set of rule exceptions. The set of rule exceptions checked by synchronous exception analyzer 44 are herein deemed synchronous exceptions (more details below). Synchronous exceptions typically comprise rule exceptions which require a relatively low computational cost to be matched to events. In some embodiments, synchronous exceptions may comprise a subset of rule exceptions that are critical for assessing the security risk posed by a monitored entity. In another example, synchronous exceptions include rule exceptions whose checking relies exclusively on resources local to host system 10 (for instance, signature databases stored locally on storage devices 20).

In turn, asynchronous exception analyzer 46 may be configured to perform an asynchronous analysis of an event occurring within a protected host system or guest VM, to determine whether it matches any of another predetermined set of rule exceptions. The set of rule exceptions checked by asynchronous exception analyzer 46 are herein termed asynchronous exceptions. In contrast to synchronous analysis, the operation of asynchronous analysis module 46 is not tied to the execution of the triggering entity, in the sense that the triggering entity is allowed to continue execution, while operations matching the triggered event to exceptions may be performed later. Asynchronous exceptions typically comprise rule exceptions which require a relatively high computational cost to be matched to events, or rule exceptions that are not considered critical for the security of host system 10. Exemplary operations that form part of asynchronous exception matching include, among others, determining the integrity of the triggering entity (for instance, using hash matching), performing a remote scan of the triggering entity (e.g., by sending information about the respective entity to a remote cloud server are receiving a maliciousness verdict from the respective server), and determining whether the triggering entity is the recipient of code injected by another entity.

FIGS. 4-A-B-C show various exemplary locations of notification handler 42, synchronous exception analyzer 44 and asynchronous exception analyzer 46 according to some embodiments of the present invention. A skilled artisan will appreciate that components 42-44-46 may execute either outside a protected VM (e.g., at the processor privilege level of hypervisor 30), within a protected VM (e.g., in kernel mode), or within a separate security VM. Placing a component within a protected VM may give the respective component access to a substantial amount of information about entities executing within the respective VM, but may make the respective component vulnerable to attack by malicious software executing at the same processor privilege level. A set of techniques, such as alternating multiple EPT views based on #VE (Virtualization Exception) and VMFUNC on Intel® platforms, might be used in order to enhance the security of security components placed within a protected VM. When the respective component executes outside the protected VM, it is relatively secure, but certain operations which require untangling the semantics of entities and events may require substantial computation.

FIG. 4-A shows an exemplary configuration wherein synchronous exception analyzer 44 execute outside a protected guest VM, while in FIGS. 4-B-C, analyzer 44 executes inside the respective guest VM, in kernel mode. Considering that synchronous processing suspends the execution of the triggering entity and therefore should be as quick as possible so as to not impact user experience, configurations wherein the operation of synchronous exception analyzer 44 does not require a costly exit from the monitored VM may be preferable. In a preferred embodiment, synchronous exception analyzer 44 may execute in the context of notification handler 42 (e.g., FIG. 4-C).

Asynchronous exception analyzer 46 may execute either outside or inside a protected guest VM. In some embodiments (see e.g., FIG. 4-C), analyzer 46 may execute in a dedicated security VM 33 exposed on host system, security VM 33 distinct from the protected guest VMs.

Depending on the execution context of components 42-44-46, their operation may require complex signaling/messaging, sometimes across virtual machine boundaries. Such signaling may be carried out using any technique known in the art of hardware virtualization. For instance, data may be transmitted via a section of memory shared between two components, and signaling may comprise a combination of VM exits and event injections.

FIG. 5 shows an exemplary exchange among components 42, 44, 46, and 48 according to some embodiments of the present invention. When a triggering entity causes the occurrence of an event within a guest VM, the event causes an event notification 52 (e.g., processor event such as VM exit or virtualization exception) to be delivered to handler 42. Handler 42 may then determine a type and a set of parameters of the currently notified event. Exemplary event types include, among others, code injection, a particular system call, creation of a disk file, and a HTTP request. Event parameters may be specific to each type of notified event. Some exemplary event parameters include, among others, an identifier of a process or thread (e.g., process ID) causing the notified event, a filename, a path, a memory address, and an operand of a processor instruction.

In some embodiments, handler 42 then passes an event indicator 54 on to synchronous exception analyzer 44. Event indicator 54 may comprise, among others, a unique identifier of the respective event (event ID), an indicator of a type of event, and a set of event parameters. Synchronous exception analyzer 44 may then attempt to match the respective event to a set of synchronous rule exceptions, e.g., by querying an exception knowledgebase 50.

Figure 6:
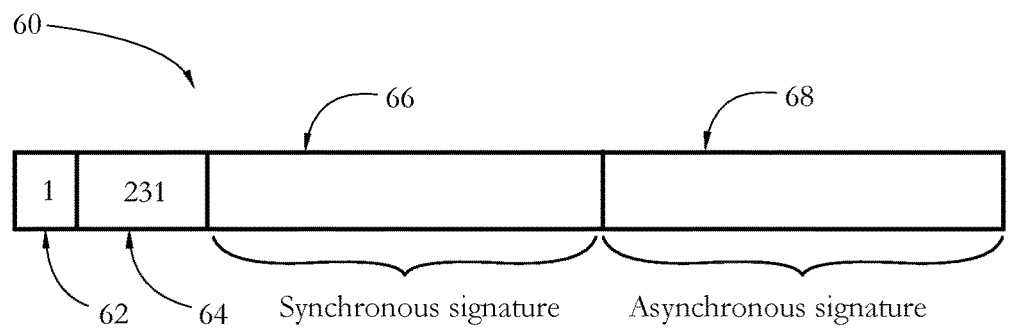
FIG. 6 illustrates an exemplary format of a rule exception according to some embodiments of the present invention.

In some embodiments, exception knowledgebase 50 stores a set of rule exception entries, for instance on computer-readable media forming part of, or communicatively coupled to, host system 10. FIG. 6 shows an exemplary format of a rule exception entry 60 according to some embodiments of the present invention. Exception entry 60 includes a synchrony flag 62, which may indicate whether the respective entry has an asynchronous part or not. Entry 60 may further comprise an event type indicator 64 indicative of an event type (e.g., a numerical ID uniquely associated to each type of event). Event type indicator 64 may allow knowledgebase 50 to selectively retrieve a rule exception entry according to a type of detected event. Alternatively, knowledgebase 50 may maintain an internal mapping (e.g., hash index) associating each rule exception entry with a type of event relevant for the respective rule exception.

Rule exception entry 60 may further comprise a synchronous exception signature 66 and an asynchronous exception signature 68. Signature 66 comprises an encoding of a synchronous rule exception, i.e., an encoding of a set of conditions to be verified synchronously by analyzer 46. In contrast, asynchronous signature 68 comprises an encoding of an asynchronous rule exception, i.e., an encoding of a set of conditions to be verified asynchronously by asynchronous exception analyzer 46.

Figure 7:
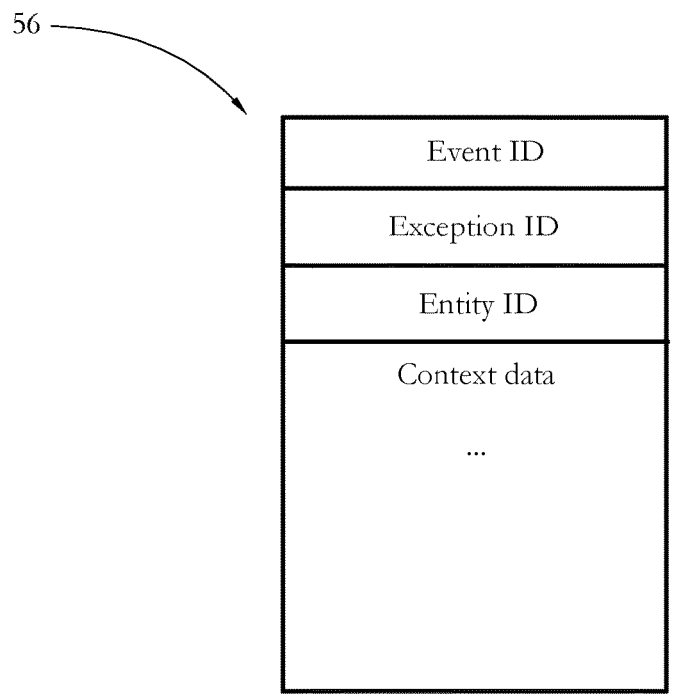
FIG. 7 shows an exemplary format of an exception analysis request (EAR) according to some embodiments of the present invention.

When a rule exception entry relevant for the current type of notified event has an asynchronous part, synchronous exception analyzer 44 may insert an exception analysis request (EAR) 56 into an EAR list 58 for later processing (more details below). In some embodiments, EAR list 58 comprises a data structure having a plurality of entries, each entry encoding a request for asynchronous rule exception matching. EAR list 58 may be organized as a multi-producer, multi-consumer queue (for instance, a first-in-first-out queue). FIG. 7 gives an exemplary format of an exception analysis request according to some embodiments of the present invention. The illustrated EAR comprises an event ID uniquely associated to the event that triggered the respective analysis. EAR 56 may further include an exception ID uniquely identifying a particular entry 60 of exception knowledgebase 50. EAR 56 may further comprise an indicator of the triggering entity. Including such an entity ID in EAR 56 may help termination watcher 48 determine whether there are any pending exception analysis requests associated with a particular executing entity (see more details below). In some embodiments, EAR 56 further includes various context data determined by notification handler 42 and/or synchronous exception analyzer 44, the context data comprising information about the respective event and/or about the triggering entity. Context data may include, among others, memory addresses, a process ID, a value of the instruction pointer (RIP) corresponding to the moment when the triggered event was generated, etc. Such context data may be used by asynchronous exception analyzer 46 when performing asynchronous rule exception matching.

Figure 8:
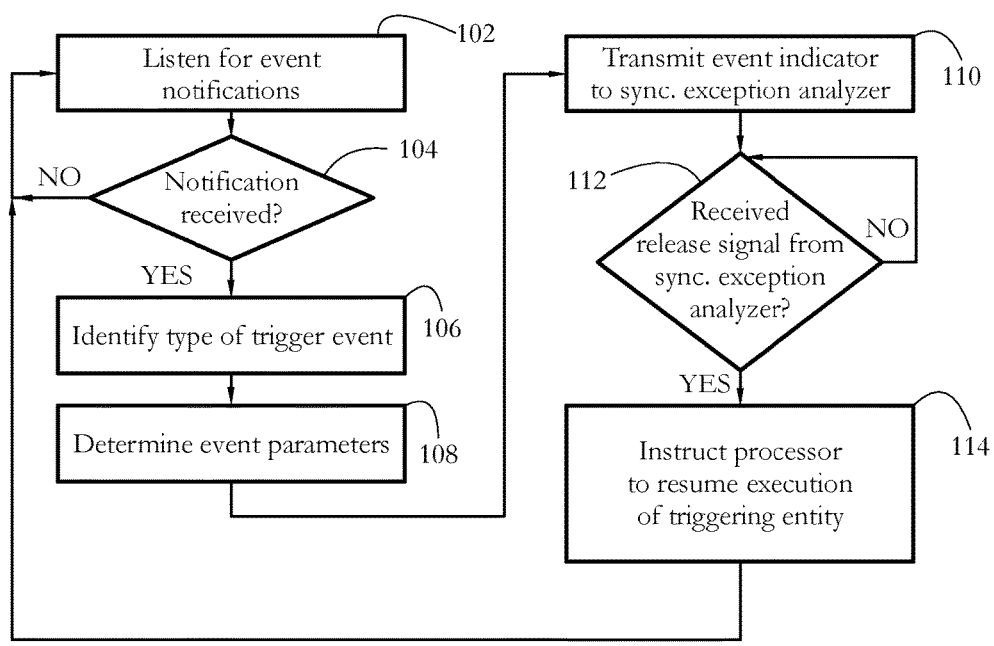
FIG. 8 shows an exemplary sequence of steps carried out by the notification handler according to some embodiments of the present invention.

FIG. 8 shows an exemplary sequence of steps performed by notification handler 42 according to some embodiments of the present invention. As shown above, handler 42 executes in a position that allows handler 42 to effectively suspend execution of the triggering entity. For instance, handler 42 may be registered as the event handler for VM exits and/or virtualization exceptions, wherein such processor events are triggered in response to the occurrence of a specific monitored event caused by software (e.g., an attempt to access a particular memory page). In response to such events, processor 12 suspends execution of the triggering entity and switches to executing notification handler 42. Notification handler 42 is therefore notified of the occurrence of the monitored event, while execution of the triggering entity is suspended. When the processor event is a VM exit, handler 42 may execute at the level of hypervisor 30.

When handler 42 receives an event notification, a sequence of steps 106-108 determine a type of event that occurred within the protected guest VM, and a set of parameters of the respective event. Handler 42 may then transmit event indicator 54 to synchronous exception analyzer 44 (step 110). In a step 112, handler 42 may wait for a release signal from analyzer 44. In some embodiments, such a release signal indicates either that the current event has matched a synchronous rule exception, or that an EAR associated with the current event was added to EAR list 58 (see details below, in relation to FIG. 9). In response to receiving the release signal, handler 42 may instruct processor 12 to resume execution of the triggering entity.

Figure 9:
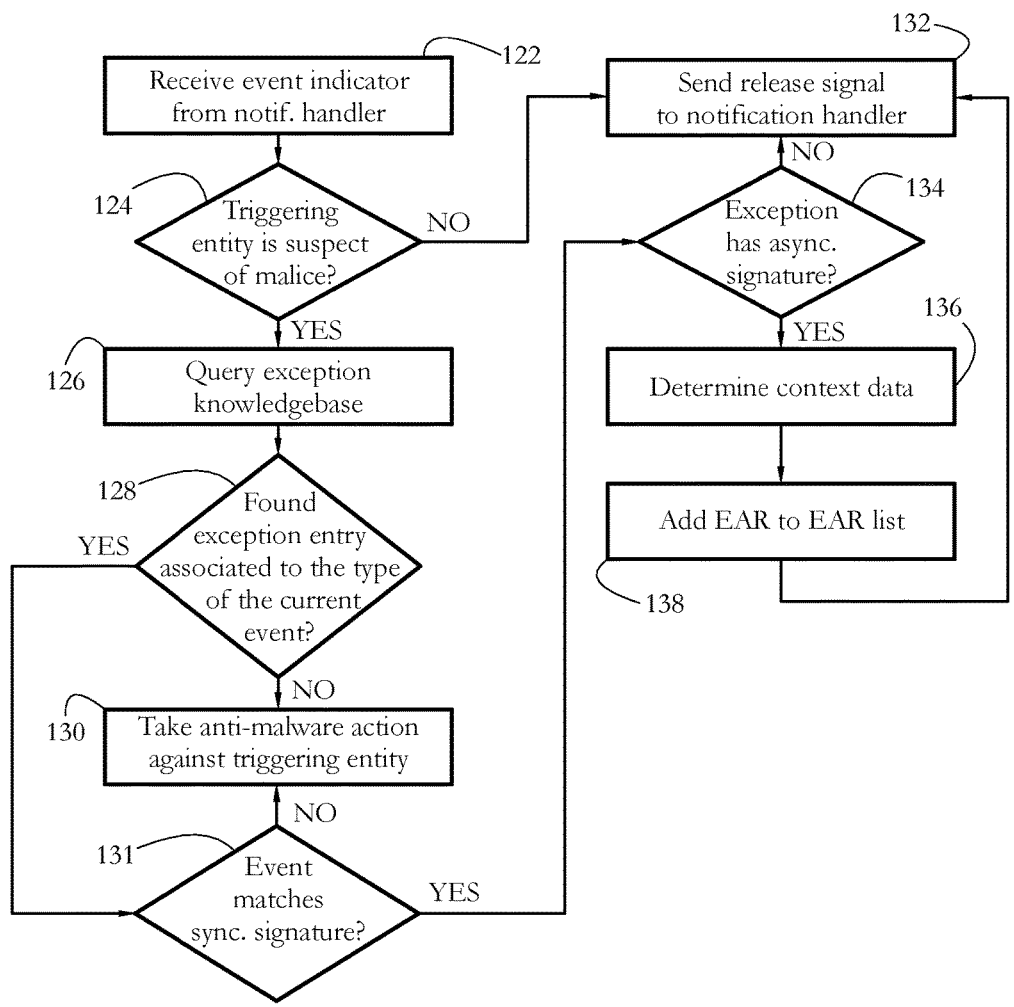
FIG. 9 illustrates an exemplary sequence of steps performed by the synchronous exception analyzer according to some embodiments of the present invention.

FIG. 9 shows an exemplary sequence of steps carried out by synchronous exception analyzer 44 according to some embodiments of the present invention. In response to receiving event indicator 54 from notification handler 42, a step 124 performs a preliminary security assessment of the triggering entity. For instance, analyzer 44 may determine whether the respective event is malware-indicative. In some embodiments, step 124 attempts to match the current <event, entity> tuple to a set of malware behavioral signatures. One example of such malware-indicative signatures comprises the sequence of events: a first entity downloads an executable file without a valid digital signature, the first entity launches a second entity from the executable file, and the second entity attempts to register itself for automatic start at system startup. Another example of malware behavioral signature comprises a driver attempting to overwrite a System Service Descriptor Table (SSDT) entry. When the preliminary assessment indicates that the triggering entity is not likely to be malicious, analyzer 44 may signal to notification handler 42 to resume execution of the triggering entity (see above).

When the preliminary assessment indicates that the triggering entity is suspect of malice, a step 126 selectively retrieves a set of rule exception entries from exception knowledgebase 50 according to an event type of the current event. When knowledgebase 50 does not contain any rule exception entry associated to the type of the current event, in a step 130 CSA 40 may take anti-malware action against the triggering entity. Such protective action may include, among others, terminating, quarantining, or otherwise incapacitating the triggering entity, and rolling back a set of changes caused to host system 10 as a result of execution of the triggering entity. In some embodiments, CSA 40 maintains a set of malware-indicative scores associated with each monitored entity. Step 130 may comprise incrementing the respective score(s) by an amount that may be event-specific. CSA 40 may further compare the score(s) with a threshold and take anti-malware action only when, for instance, a score exceeds a predetermined threshold.

When knowledgebase 50 contains at least one rule exception entry 60 associated with the event type of the current event, a step 131 determines whether the current event matches a synchronous rule exception of the respective rule exception entry. Step 131 may comprise testing whether a set of conditions encoded by synchronous signature 66 of the respective rule exception are satisfied by the <current event, triggering entity> tuple. As such, step 131 may include carrying out a set of computations, for instance to determine an entity type of the triggering entity according to event indicator 54. Exemplary entity types include specific components of OS 34, an instance of a particular application (e.g., Adobe® Acrobat Reader®, Microsoft® Word®), a particular category of entities (e.g., file manager, browser), etc. Other examples of entity types include a driver, a shared library (e.g., a dynamic link library—DLL), and an injected section of code.

When no synchronous signature match is found, analyzer 44 concludes that the triggering entity is indeed malicious, and advances to step 130 described above. When the current event matches the synchronous signature of at least one rule exception, in a step 134, analyzer 44 determines whether the respective rule exception entry also comprises an asynchronous signature. In some embodiments, step 134 includes checking the value of synchrony flag 62 (see FIG. 6). When no, analyzer 44 signals to handler 42 to resume execution of the triggering entity. When yes, a step 136 determines context data about the current event and/or about the triggering entity. A further step 138 formulates EAR 56 and adds EAR 56 to EAR list 58. Synchronous exception analyzer 44 may then signal handler 42 to resume execution of the triggering entity.

Figure 10:
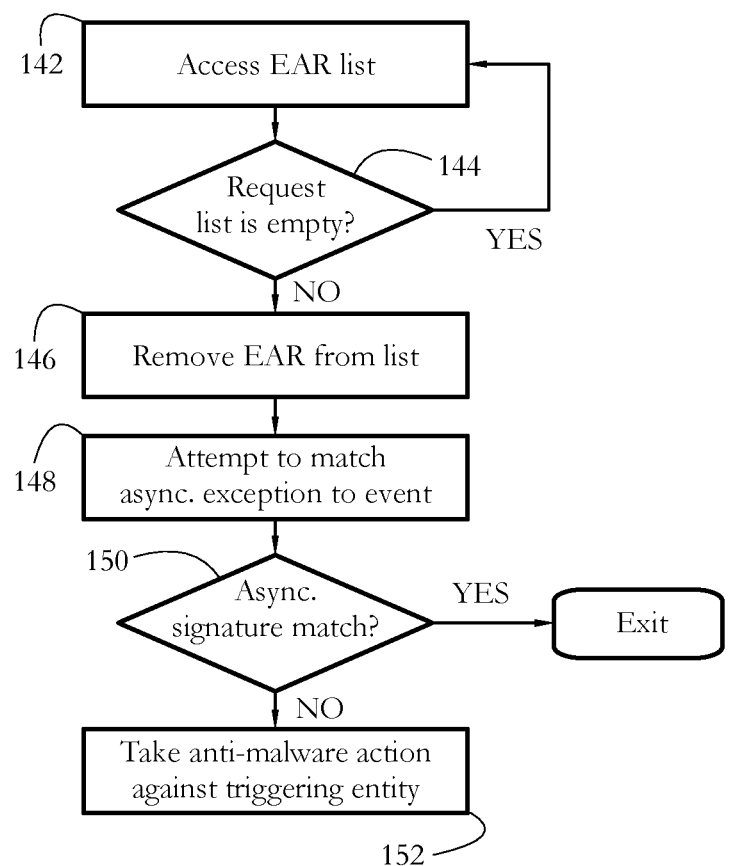
FIG. 10 shows an exemplary sequence of steps carried out by the asynchronous exception analyzer according to some embodiments of the present invention.

FIG. 10 shows an exemplary sequence of steps carried out by such an instance of asynchronous exception analyzer 46. In some embodiments, computer security application 40 manages a thread pool for asynchronous rule exception matching. Threads of the pool may execute outside or within a protected VM, or within a separate security VM (see, e.g., FIG. 4-C). When such threads execute within the respective protected VM, they may execute in kernel mode (ring 0). Whenever a thread of the pool becomes available, CSA 40 may launch an instance of asynchronous exception analyzer 46.

In a sequence of steps 142-144, asynchronous exception analyzer 46 determines whether there are currently any outstanding exception analysis requests. When EAR list 58 is non-empty, analyzer 46 may remove an EAR from list 58 and attempt to match the event indicated by the respective EAR to an asynchronous rule exception indicated by the respective EAR. Step 148 may comprise further determination of event parameters and/or of information about the entity triggering the respective event. Such computations may include, for instance, calculation of hashes, memory lookups, establishing filiation relationships between various software entities (e.g., which processes have spawned other processes), emulation, etc. In some embodiments, step 148 includes exchanging data with a remote security server (cloud scanning).

In some embodiments, when the respective event matches the asynchronous rule exception, analyzer 46 quits. Terminating the current instance of analyzer 46 indicates that the respective event is not indicative of a computer security threat, and therefore no more analysis of the respective event is necessary. When analyzer 46 determines that the event does not match the respective asynchronous rule exception, a step 152 may signal CSA 40 to take protective anti-malware action (see above, step 130 in FIG. 9).

In an alternative embodiment, the asynchronous rule exception is formulated so that a match indicates that the respective entity is malicious. In such embodiments, analyzer 46 may quit when the event does not match the respective rule exception, and CSA 40 may take anti-malware action when the event matches the respective rule exception.

Figure 11:
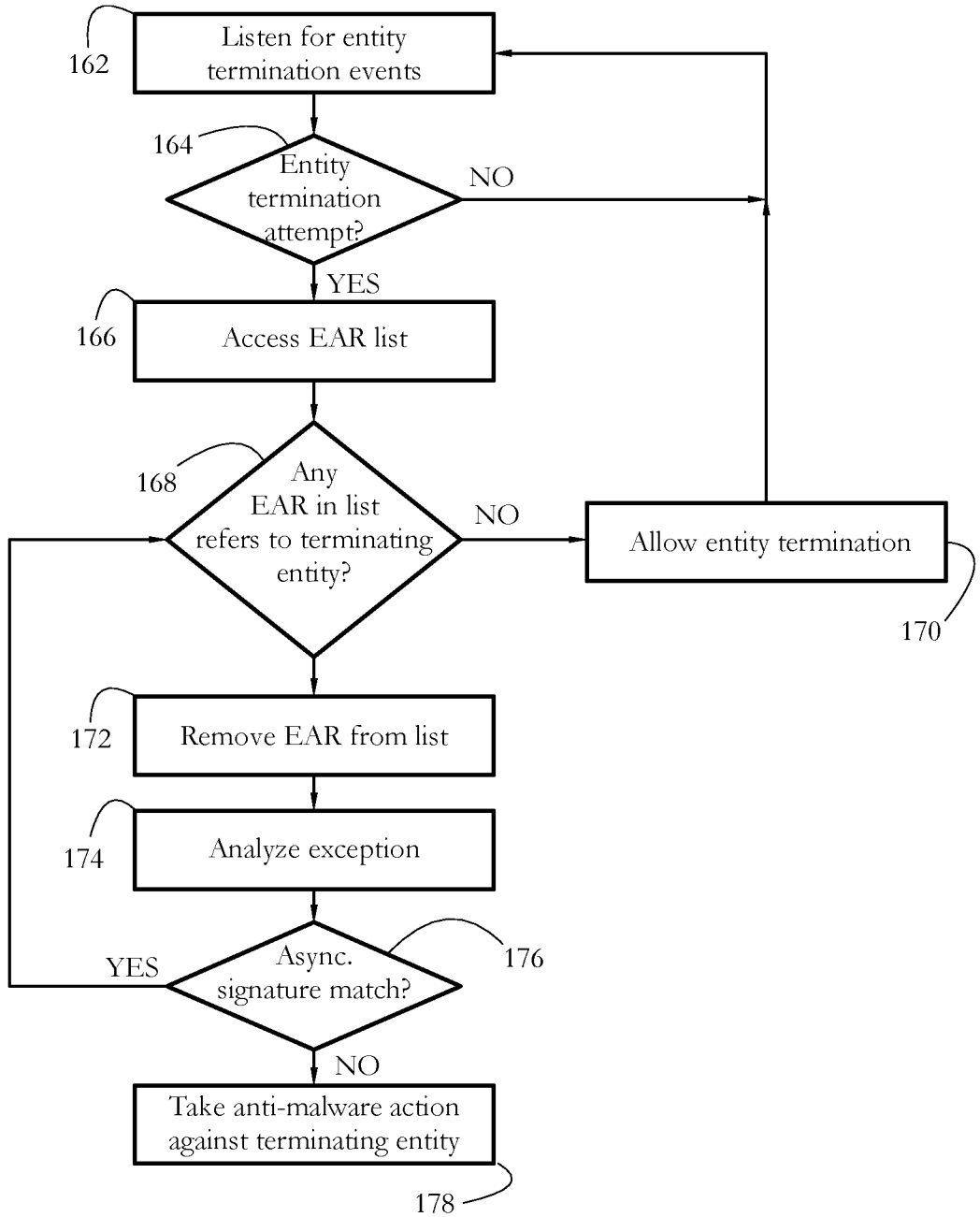
FIG. 11 illustrates an exemplary sequence of steps carried out by the termination watcher according to some embodiments of the present invention.

FIG. 11 shows an exemplary sequence of steps performed by termination watcher 48 according to some embodiments of the present invention. Termination watcher 48 may execute outside or within the protected virtual machine, and is communicatively coupled at least with asynchronous exception analyzer 46.

Since asynchronous rule exception analysis is not tied to the execution of the triggering entity, a situation may arise wherein the triggering entity terminates execution before asynchronous exception analysis 46 gets to process an exception analysis request related to the respective entity. In such situations, a malicious entity may escape undetected, or may do some damage that cannot be rolled back. To prevent such situations, in some embodiments of the present invention, termination watcher 48 detects an attempt by the OS to terminate an entity (steps 162-164). Detecting the termination attempt may effectively suspend execution of the terminating entity. Step 162 may comprise collaborating with notification handler 42, e.g., handler 42 may actually detect the termination attempt, and signal to termination watcher 48.

In response to detecting a termination attempt, in a sequence of steps 166-168, termination watcher 48 may determine whether there are still any outstanding exception analysis requests for the terminating entity. When no, a step 170 may instruct processor 12 to resume execution of the terminating entity, in effect allowing the respective entity to terminate. In some embodiments, step 170 comprises sending a release signal to notification handler 42, instructing handler 42 to release the terminating entity.

When EAR list 58 contains at least one EAR associated with the terminating entity, termination watcher 48 may maintain the respective entity suspended until all such pending requests are processed. A sequence of steps 172-174 forces the processing of a request associated with the respective terminating entity (the sequence may be repeated until all such requests are processed). Step 174 may include invoking asynchronous exception analyzer 46 to process each outstanding EAR related to the terminating entity. When analyzer 46 determines that the event indicated by the respective EAR does not match the asynchronous rule exception indicated by the respective EAR, a step 178 may signal CSA 40 to take protective action against the terminating entity (see above, in relation to FIGS. 9-10).

The exemplary systems and methods described above enable an efficient behavioral monitoring of software entities. In some embodiments, a notification mechanism is deployed to detect the occurrence of security-relevant events within a protected host system or virtual machine, and to report the respective events to security software. The security software then analyzes the respective events to determine whether they are indicative of computer security threat such as malware, spyware, unauthorized intrusion, etc.

Some conventional behavioral systems and methods rely on malware behavioral signatures to determine whether an entity is malicious. A malware behavioral signature typically comprises a set of conditions which, when satisfied by an <event, entity> tuple, establish that the respective event is indicative of malice, and therefore that the software entity triggering the respective event is likely to be malicious. To prevent the triggering entity from carrying out its malicious activities, conventional systems and methods suspend execution of the triggering entity while the triggered event is analyzed for indicators of malice.

Some embodiments of the present invention rely on two observations. First, not all occurrences of a particular type of event are equally malware-indicative. The same type of event (e.g., accessing a URL, opening a disk file, etc.) may indicate malice in some scenarios, while being completely benign in other scenarios. In one such example, an event may not be indicative of malice when taken in isolation, but may be malware-indicative when it occurs as part of a specific sequence of events. For instance, writing to a disk file may be a benign operation when taken in isolation (i.e., a lot of processes and applications access the disk legitimately). However, the write event may be suspicious when the entity performing the writing is the recipient of code injected from another entity. This observation suggests that successful malware detection may necessitate fairly complex malware behavioral signatures, that are able to discern between various scenarios as described above. The use of such complex behavioral signatures typically carries a relatively high computational cost. Furthermore, optimizing malware behavioral signatures for high detection rate typically leads to an increase in false-positive detections (benign events wrongly classified as malware-indicative, legitimate entities wrongly classified as malicious). False-positive classification is particularly undesirable in the field of computer security, since it may lead to loss of data and loss of productivity for the user.

The second observation is that suspending execution of the triggering entity for the whole duration of malware behavioral signature matching negatively impacts user experience. This is especially true in the case of complex behavioral signatures, and in hardware virtualization configurations wherein event analysis is performed from a position outside the VM where the event has occurred (for instance, from the level of hypervisor 30).

In contrast to such conventional computer security systems and methods, some embodiments use a set of rule exception signatures to complement malware behavioral signatures. A rule exception signature comprises a set of conditions which, when satisfied by an <event, entity> tuple, establish that the respective event is benign, and therefore that the triggering entity is not malicious. A rule exception therefore provides an encoding of an exception to a rule which would typically indicate malicious behavior. In an exemplary use case scenario, security software may first attempt to match a detected event to a set of relatively simple, computationally cheap malware behavioral signatures, to determine whether the triggering entity is likely to be malicious. When yes, security software may further attempt to match the respective event to a set of rule exception signatures. A rule exception signature match may indicate that the triggering entity is actually benign.

The addition of rule exception signatures creates the opportunity to use relatively simple signatures instead of the fairly complex signatures necessary when malware behavior signature matching is used alone. Some embodiments therefore reduce the computational overhead produced by security software, while also reducing the rate of false positive detections.

Furthermore, in some embodiments of the present invention, the matching of rule exception signatures is performed at least in part in an asynchronous manner, i.e., while the entity that triggered the respective event is allowed to continue execution. By choosing not to suspend the execution of the triggering entity for the whole duration of the security analysis, the impact on user experience is significantly reduced. In some embodiments, rule exception signatures are optimized for low overhead: signatures that carry a relatively low computational cost are used in synchronous matching, while signatures that are relatively expensive are used in asynchronous matching.

While there is some similarity between conventional malware behavioral signatures and rule exception signatures, their use and semantics are rather different. For instance, the statement that rule exception signatures are simply the complement or the reverse of malware behavior signatures is not true. Malware behavior signatures and rule exception signatures are not mutually exclusive. For instance, when an event matches a malware behavior signature, it does not mean that it cannot match a rule exception signature as well. Instead, it is precisely in situations wherein an event matches both malware behavioral signatures and rule exception signatures that rule exception signatures are at their most valuable, since they allow an efficient decision process of malware detection.

An example of synchronous vs. asynchronous rule exceptions and of their relation to malware behavioral signatures comprises detecting an attempt by a monitored software entity to patch the code of a shared executable module (e.g., library). Code patching is usually indicative of malice, so it may be encoded as such in a malware behavioral signature. Using the respective signature may trigger a malware alert every time code patching is detected. However, various software entities (e.g. the OS) perform legitimate code patching, for instance when launching a new process. Likewise, one process from a given software application suite (e.g., Microsoft® Office®) may legitimately patch another process from the same suite. In some embodiments of the present invention, such situations may be addressed using rule exceptions. An exemplary synchronous rule exception may check whether the patching process is one of the trusted OS processes, and whether the target process (the one being patched) is at startup. When both conditions are satisfied, then the patching entity is deemed to be benign (legitimate). This way, when the OS starts a process and performs patching, it can proceed without being blocked by to CSA 40. In contrast, according to the above rule exception, if an unknown process tries to perform the same patching operation, it will be blocked. To allow some unknown processes to perform patching, some embodiments may use a two-part rule exception signature: the synchronous part may verify the identity of the entities participating in code patching, while the asynchronous part may verify the injected buffer/code itself (e.g. by disassembling it and/or searching within it for a specific code pattern). When the injected code is not malicious, the unknown process may be deemed to be benign.

In another example, a malware behavior signature may indicate that code injection is malware-indicative. A synchronous rule exception signature may allow code injection when the process that performs the injection is well-known and trusted. However, the same rule exception signature may have an asynchronous part, which performs content analysis of the injected code. When the content seems unusual for that particular process, the respective process might be deemed malicious. In this example, the content analysis, which is relatively expensive in terms of computational overhead, is performed asynchronously, i.e., while the respective process is executing, so as to have a minimal effect on user experience.

In yet another example, a malware behavior signature may indicate that an attempt by a browser to load a plugin is indicative of malware. However, some plugins are benign and should be allowed to operate. In an exemplary embodiment, a synchronous rule exception may test whether the respective plugin is digitally signed by a certain authority, and when yes, determine that the browser is benign. In the case of a synchronous signature match, the browser may be allowed to load and execute the plugin. A further rule exception may then determine asynchronously whether the certificate used for signing the plugin is currently valid or has been revoked. When the respective certificate has been revoked, CSA 40 may terminate the browser and/or display an alert. Testing certificate validity typically requires sending a request to a remote server, and therefore may substantially impact user experience if done synchronously.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising a hardware processor and a memory, the hardware processor configured to execute a target entity, a synchronous exception analyzer, and an asynchronous exception analyzer, wherein the hardware processor is further configured to:
in response to detecting an occurrence of an event caused by an execution of the target entity, suspend the execution of the target entity, and
in response to suspending execution of the target entity, switch to executing the synchronous exception analyzer;
wherein the synchronous exception analyzer is configured to:
determine whether the target entity is suspect of being malicious according to the event,
in response, when the target entity is suspect of being malicious, selectively retrieve a rule exception signature from a plurality of rule exception signatures, the rule exception signature retrieved according to the event, wherein the rule exception signature comprises an encoding of a first condition and an encoding of a second condition,
in response to retrieving the rule exception signature, determine whether the first condition is satisfied according to the event and according to the target entity,
in response to determining whether the first condition is satisfied, when the first condition is satisfied, cause the hardware processor to resume execution of the target entity, and
in response to determining whether the first condition is satisfied, when the first condition is not satisfied, determine that the target entity is malicious; and
wherein the asynchronous exception analyzer is configured to:
in response to the hardware processor resuming execution of the target entity, determine whether the second condition is satisfied according to the event and according to the target entity,
in response to determining whether the second condition is satisfied, when the second condition is satisfied, determine that the target entity is not malicious, and
in response to determining whether the second condition is satisfied, when the second condition is not satisfied, determine that the target entity is malicious.

2. The host system of claim 1, wherein:
the synchronous exception analyzer is further configured, in response to determining whether the first condition is satisfied, when the first condition is satisfied, to insert an analysis request into a request queue, the analysis request formulated according to the second condition, according to the event, and further according to the target entity; and
the asynchronous exception analyzer is further configured, in preparation for determining whether the second condition is satisfied, to remove the analysis request from the request queue.

3. The host system of claim 1, wherein the hardware processor is further configured to:
in response to detecting an attempt to terminate the target entity, suspend the attempt; and
in response to suspending the attempt, switch to executing a termination watcher connected to the asynchronous exception analyzer, the termination watcher configured to:
search the request queue for a second analysis request formulated according to the target entity, the second analysis request indicating a third condition,
invoke the asynchronous exception analyzer to process the second analysis request, and
in response to invoking the asynchronous exception analyzer, when the asynchronous exception analyzer determines that the third condition is satisfied, cause the hardware processor to resume the attempt to terminate the target entity.

4. The host system of claim 1, wherein the target entity executes within a guest virtual machine exposed by the host system, and wherein the asynchronous exception analyzer executes outside the guest virtual machine.

5. The host system of claim 1, wherein the asynchronous exception analyzer executes within a security virtual machine exposed by the guest system, the security virtual machine executing concurrently with the guest virtual machine.

6. The host system of claim 1, wherein the rule exception signature is configured so that determining whether the first condition is satisfied carries a substantially lower computational cost than determining whether the second condition is satisfied.

7. The host system of claim 1, wherein the event comprises an attempt to access the memory in a manner that violates a memory access permission.

8. The host system of claim 1, wherein:
determining whether the first condition is satisfied comprises determining whether the target entity has injected code into a second entity; and
determining whether the second condition is satisfied comprises determining whether the code is malicious.

9. A non-transitory computer-readable medium storing processor instructions which, when executed by a hardware processor of a host system, cause the host system to form a synchronous exception analyzer and an asynchronous exception analyzer, wherein the hardware processor is configured to:

in response to detecting an occurrence of an event caused by an execution of the target entity, suspend the execution of the target entity, and in response to suspending execution of the target entity, switch to executing the synchronous exception analyzer;

wherein the synchronous exception analyzer is configured to:
determine whether the target entity is suspect of malice according to the event, in response, when the target entity is suspect of malice, selectively retrieve a rule exception signature from a plurality of rule exception signatures, the rule exception signature retrieved according to the event, wherein the rule exception signature comprises an encoding of a first condition and an encoding of a second condition, in response to retrieving the rule exception signature, determine whether the first condition is satisfied according to the event and according to the target entity, in response to determining whether the first condition is satisfied, when the first condition is satisfied, cause the hardware processor to resume execution of the target entity, and in response to determining whether the first condition is satisfied, when the first condition is not satisfied, determine that the target entity is malicious; and wherein the asynchronous exception analyzer is configured to:
in response to the hardware processor resuming execution of the target entity, determine whether the second condition is satisfied according to the event and according to the target entity, in response to determining whether the second condition is satisfied, when the second condition is satisfied, determine that the target entity is not malicious, and in response to determining whether the second condition is satisfied, when the second condition is not satisfied, determine that the target entity is malicious.

10. The computer-readable medium of claim 9, wherein:
the synchronous exception analyzer is further configured,
in response to determining whether the first condition is satisfied, when the first condition is satisfied, to insert an analysis request into a request queue, the analysis request formulated according to the second condition, according to the event, and further according to the target entity; and the asynchronous exception analyzer is further configured, in preparation for determining whether the second condition is satisfied, to remove the analysis request from the request queue.

11. The computer-readable medium of claim 10, wherein the hardware processor is further configured to:
in response to detecting an attempt to terminate the target entity, suspend the attempt; and in response to suspending the attempt, switch to executing a termination watcher connected to the asynchronous exception analyzer, the termination watcher configured to:
search the request queue for a second analysis request formulated according to the target entity, the second analysis request indicating a third condition, invoke the asynchronous exception analyzer to process the second analysis request, and in response to invoking the asynchronous exception analyzer, when the asynchronous exception analyzer determines that the third condition is satisfied, cause the hardware processor to resume the attempt to terminate the target entity.

12. The computer-readable medium of claim 9, wherein the target entity executes within a guest virtual machine exposed by the host system, and wherein the asynchronous exception analyzer executes outside the guest virtual machine.

13. The computer-readable medium of claim 12, wherein the asynchronous exception analyzer executes within a security virtual machine exposed by the guest system, the security virtual machine executing concurrently with the guest virtual machine.

14. The computer-readable medium of claim 9, wherein the rule exception signature is configured so that determining whether the first condition is satisfied carries a substantially lower computational cost than determining whether the second condition is satisfied.

15. The computer-readable medium of claim 9, wherein the event comprises an attempt to access a memory of the host system in a manner that violates a memory access permission.

16. The computer-readable medium of claim 9, wherein:
determining whether the first condition is satisfied comprises determining whether the target entity has injected code into a second entity; and determining whether the second condition is satisfied comprises determining whether the code is malicious.

17. A method of protecting a host system against computer security threats, the host system comprising a hardware processor and a memory, the method comprising:
employing the hardware processor to detect an occurrence of an event caused by an execution of a target entity;

in response to detecting the occurrence of the event, employing the hardware processor to suspend the execution of the target entity;

in response to suspending the execution of the target entity, employing the hardware processor to switch to executing a synchronous exception analyzer configured to:
determine whether the target entity is suspect of malice according to the event, in response, when the target entity is suspect of malice, selectively retrieve a rule exception signature from a plurality of rule exception signatures, the rule exception signature retrieved according to the event, wherein the rule exception signature comprises an encoding of a first condition and an encoding of a second condition, in response to retrieving the rule exception signature, determine whether the first condition is satisfied according to the event and according to the target entity, in response to determining whether the first condition is satisfied, when the first condition is satisfied, cause the hardware processor to resume execution of the target entity, and in response to determining whether the first condition is satisfied, when the first condition is not satisfied, determine that the target entity is malicious;

in response to the hardware processor resuming execution of the target entity, employing the hardware processor to determine whether the second condition is satisfied according to the event and according to the target entity;

in response to determining whether the second condition is satisfied, when the second condition is satisfied, determining that the target entity is not malicious; and in response to determining whether the second condition is satisfied, when the second condition is not satisfied, determining that the target entity is malicious.

18. The method of claim 17, further comprising:

in response to determining whether the first condition is satisfied, when the first condition is satisfied, employing the hardware processor to insert an analysis request into a request queue, the analysis request formulated according to the second condition, according to the event, and further according to the target entity; and in preparation for determining whether the second condition is satisfied, employing the hardware processor to remove the analysis request from the queue.

19. The method of claim 18, further comprising:

in response to detecting an attempt to terminate the target entity, employing the hardware processor to suspend the attempt;

in response to suspending the attempt, employing the hardware processor to search the request queue for a second analysis request formulated according to the target entity, the second analysis request indicating a third condition;

in response to searching for the second analysis request, determine whether the third condition is satisfied according to the target entity;

in response, when the third condition is satisfied, employing the hardware processor to terminate the target entity.

* * * * *